United States Patent
Tzur-David et al.

(10) Patent No.: US 11,750,391 B2
(45) Date of Patent: Sep. 5, 2023

(54) SYSTEM AND METHOD FOR PERFORMING A SECURE ONLINE AND OFFLINE LOGIN PROCESS

(71) Applicant: SECRET DOUBLE OCTOPUS LTD, Tel-Aviv (IL)

(72) Inventors: Shimrit Tzur-David, Mevaseret Zion (IL); Chen Tetelman, Tel Aviv (IL)

(73) Assignee: SECRET DOUBLE OCTOPUS LTD., Tel-Aviv (IL)

( * ) Notice: Subject to any disclaimer, the term of this patent is extended or adjusted under 35 U.S.C. 154(b) by 120 days.

(21) Appl. No.: 17/128,121

(22) Filed: Dec. 20, 2020

(65) Prior Publication Data

US 2022/0209955 A1 Jun. 30, 2022

(51) Int. Cl.
*H04L 9/32* (2006.01)
*H04L 9/30* (2006.01)
*H04L 9/08* (2006.01)

(52) U.S. Cl.
CPC .......... *H04L 9/3231* (2013.01); *H04L 9/0894* (2013.01); *H04L 9/3073* (2013.01); *H04L 9/3271* (2013.01)

(58) Field of Classification Search
CPC ... H04L 9/3231; H04L 9/3073; H04L 9/3271; H04L 9/0894; H04L 9/0861; H04L 63/061; H04L 63/083; H04L 63/0861; H04L 9/0825; H04L 9/3226; H04L 9/3247; H04L 63/0435; G06F 21/33
See application file for complete search history.

(56) References Cited

U.S. PATENT DOCUMENTS

| | | | |
|---|---|---|---|
| 10,212,136 B1 | 2/2019 | Gehret et al. | |
| 2010/0138666 A1* | 6/2010 | Adams | G07F 7/1091 713/186 |
| 2011/0016320 A1* | 1/2011 | Bergsten | H04L 63/083 713/170 |
| 2011/0055585 A1* | 3/2011 | Lee | H04L 9/3218 713/183 |
| 2012/0297190 A1* | 11/2012 | Shen | H04L 9/0866 713/168 |
| 2015/0082397 A1* | 3/2015 | Zhong | H04W 4/023 726/5 |

(Continued)

*Primary Examiner* — Farid Homayounmehr
*Assistant Examiner* — Brian William Avery
(74) *Attorney, Agent, or Firm* — PEARL COHEN ZEDEK LATZER BARATZ LLP

(57) ABSTRACT

A computer-based system and method for performing an offline login to a local device, including: generating a pair of an auxiliary (AUX) public key and an AUX private key; receiving a password at the local device; reconstructing a symmetric key from a first value stored on the local device and a second value stored on an authenticator; encrypting the password with the AUX public key to obtain a locally encrypted password; encrypting the AUX private key with the symmetric key to obtain an encrypted AUX private key; and deleting the symmetric key, and when performing the offline login: reconstructing the symmetric key; decrypting the encrypted AUX private key with the symmetric key to obtain the AUX private key; decrypting the locally encrypted password with the AUX private key to obtain the password; and using the password to perform the offline login.

15 Claims, 5 Drawing Sheets

(56) References Cited

U.S. PATENT DOCUMENTS

| | | |
|---|---|---|
| 2016/0014110 A1* | 1/2016 | Kurspahic ............. H04L 63/083 |
| | | 713/183 |
| 2016/0149705 A1 | 5/2016 | Bobinski et al. |
| 2019/0036913 A1 | 1/2019 | Tzur-David et al. |
| 2019/0036914 A1 | 1/2019 | Tzur-David et al. |
| 2019/0228406 A1* | 7/2019 | Patel .................. G06Q 20/3674 |
| 2020/0028679 A1* | 1/2020 | Chumbley ............ H04L 9/0863 |
| 2020/0195630 A1* | 6/2020 | Mallinson ............. H04L 9/006 |
| 2020/0259638 A1* | 8/2020 | Carmignani .......... H04L 9/3239 |
| 2020/0351660 A1* | 11/2020 | Avetisov ............... H04L 63/062 |
| 2021/0176059 A1* | 6/2021 | Hertrich ............... H04L 9/3271 |

\* cited by examiner

SYSTEM AND METHOD FOR PERFORMING A SECURE ONLINE AND OFFLINE LOGIN PROCESS

FIELD OF THE INVENTION

The present invention relates generally to performing secure login process, and specifically, to performing a login process offline.

BACKGROUND

Many computer networks have special service to manage access permissions to networked resources and to authenticate users that access resources. The service may include a password database that may store passwords of users, clear or hashed. When a user wants to login to a resource, e.g., a personal computer (PC) of the user, the user may type a username and a password. The service may authenticate the user using the password. The service may authorize the login request if the user is authenticated and refuse the login request otherwise. For example, in Windows® domain networks, those services may be provided by the Active Directory® service (AD).

Some computer networks may include a second entity in the flow, referred to herein as an identity provider (IdP) or an authentication service. The authentication service may be responsible of validating the user and for providing passwords. If the user is successfully validated, the authentication service may change the user's password in the password database and send the new password to the user's device. Now the user's device may complete the authentication to the password database with the new password.

In some cases, the user validation flow may further include an authenticator. The authenticator may be an external hardware token, a mobile app, a biometric reader, etc., that may be configured to authenticate the user. To login, an identification number (ID) or username of the user may be provided to a client application programming interface (API) on the user device, e.g., the user may type the ID or username into the API on the user device or choose their ID or username among presented one or more options. The client API may send an authentication request to the authentication service, the authentication service may send back an authentication response to the client API that may send the authentication response to the authenticator. The authenticator may validate the user using any applicable authentication method, e.g., using a PIN code or a biomenic identification such as a fingerprint, etc. The authenticator may send a response to the client API which may further send the response to the authentication service to complete the validation flow. After the user is validated, the authentication service may send the current password to the client API or change the user's password in the password database and send the new password to the client API that, in a login process, may use the new password to complete the login process.

SUMMARY

According to embodiments of the invention, a system and method for performing an offline login to a local device may include generating a pair of an auxiliary (AUX) public key and an AUX private key; receiving a password at the local device; reconstructing a symmetric key; encrypting the password with the AUX public key to obtain a locally encrypted password; encrypting the AUX private key with the symmetric key to obtain an encrypted AUX private key; and deleting the symmetric key; when performing the offline login: reconstructing the symmetric key; decrypting the encrypted AUX private key with the symmetric key to obtain the AUX private key; decrypting the locally encrypted password with the AUX private key to obtain the password; and using the password to perform the offline login.

According to embodiments of the invention, receiving the password may include: receiving an encrypted password from an authentication service by the local device; and decrypting the encrypted password with a local private key to obtain the password.

Embodiments of the invention may include, when performing the offline login: verifying an identity of the user by the authenticator prior to reconstructing the symmetric key.

According to embodiments of the invention, verifying the identity of the user by the authenticator may include performing biometric authentication.

According to embodiments of the invention, verifying the identity of the user by the authenticator may include obtaining a PIN code from the user and comparing the obtained PIN code with a stored PIN code.

Embodiments of the invention may include, when performing the offline login: sending a challenge to the authenticator; verifying an identity of the user by the authenticator; signing the challenge by the authenticator; sending the signed challenge to the local device; and verifying the signed challenge by the local device.

According to embodiments of the invention, the symmetric key may be reconstructed from a first value stored on the local device and a second value stored on an authenticator.

According to embodiments of the invention, reconstructing the symmetric key may include sending the first value from the local device to the authenticator; reconstructing the symmetric key by the authenticator; and sending the symmetric key to the local device.

According to embodiments of the invention, the symmetric key may be reconstructed by hashing a concatenation of the first value with the second value.

Embodiments of the invention may include, performing online login by: sending a login request and a username from the local device to an authentication service; obtaining a challenge from the authentication service; sending the challenge and the first value to the authenticator; verifying an identity of the user by the authenticator; signing the challenge by the authenticator to obtain a signed challenge; reconstructing the symmetric key by the authenticator using the first value and the second value; sending from the authenticator to the local device, the signed challenge and the symmetric key; sending by the local device the signed challenge to the authentication service; verifying the signed challenge by the authentication service; and sending the encrypted password from the authentication service to the local device.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
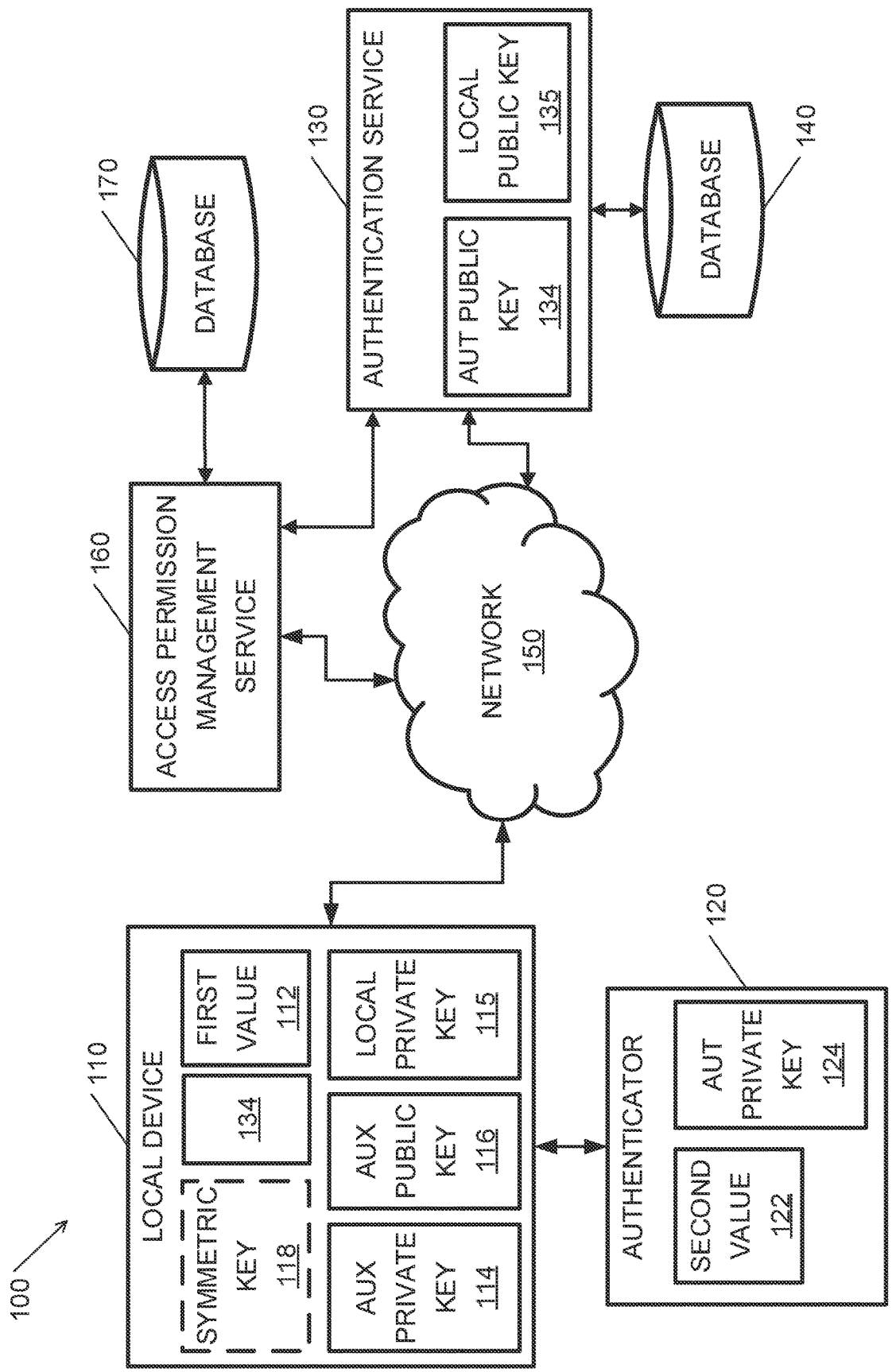
FIG. 1 is a system according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to execute operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

In typical computer networks, a user may login to a computer, referred to herein as a local device, by providing a username and a password, or other credentials, to the local device, e.g., to an agent API installed on the local device. In a next step, the local device may provide the username and password (or other credentials) to an access permission management service. The name, password and other credentials of the user may be used to identify and authenticate the user, for example, the access permission management service may authenticate the user using the password of the local device and a password stored on a password database of the access permission management service and enable the login if the user is authenticated. Other methods may be used.

According to embodiments of the invention, a dedicated service, server or application referred to herein as authentication service or IdP, may provide a password, a temporary password or a onetime password (OTP), referred to herein as a password, for a login process. The local device may communicate with the authentication service over a network, e.g., the internet. When a communication exists between the local device and the authentication service, the login process may be referred to herein as an online login. In an online login process, a user may provide a username to the local device and the password may be provided by the authentication service to the local device and to the access permission management service. After obtaining the username and password, the local device may perform the login process together with access permission management service in the ordinary manner. For example, the local device may provide the username received from the user service to the access permission management service, and the access permission management service may authenticate the user using the password received from the authentication service and the password from the local device and enable the login if the user is authenticated.

According to embodiments of the invention, in an online login the authentication service may authenticate the user using any applicable authentication protocol. The authentication service may provide the password to the local device and access permission management service only if the identity of the user is verified.

Current authentication protocols may rely on private-public key cryptography. Private-public key cryptography requires a pair of matching keys including a private key and a matching public key. When using a pair of matching private key and public key, a challenge (e.g., a string of characters) signed with the private key, may be verified only when the matching public key is used. A challenge signed with the private key may be referred to herein as a signed challenge or signature. Thus, if an entity verifies a signed challenge with a public key, the entity may verify that whoever signed the challenge had a possession of the private key, e.g., the identity of the signing entity is verified. This principle is widely used for many authentication protocols. One such protocol is the fast identity online (FIDO) protocol, provided by the FIDO alliance.

According to embodiments of the invention, a pair of matching private-public keys, referred to herein as the authenticator (AUT) keys, may be used by the authentication service to authenticate the identity of a user in an online login process (and by the local device in an offline login process). The AUT private key may be owned or stored by an authenticator associated with the local device, and a matching AUT public key may be provided to the authentication service and to the local device, e.g., at startup or at registration or at each session. When initiating a login, the authentication service may verify that the authenticator owns or stores the AUT private key by requesting the authenticator to sign a challenge. For example, the authentication service may send a challenge to the local device, and the local device may forward the challenge to the authenticator. The authenticator may sign the challenge using the AUT private key. In some embodiments, the authenticator may verify the identity of the user using any applicable method such as PIN code (e.g. a brief series of numbers or letters) or biometric identification and sign the challenge once the identity of the user is verified. The authenticator may send the signed challenge to the local device and the local device may send the signed challenge to the authentication service. The authentication service may verify the signed challenge using the matching AUT public key. If, indeed, the signed challenge is successfully verified using the matching AUT public key, the identity of the user is authenticated because only the authenticator holds or stores the AUT private key. Thus, the authentication service may send the password to the local device and to the access permission management service. If, however, the signed challenge is not verified successfully using the matching AUT public key, the identity of the user is not authenticated, and the authentication service may deny the login process and may not send the password to the local device and the access permission management service.

A second pair of matching private-public keys, referred to herein as the local keys, may be used to secure the password sent by the authentication service to the local device. The local private key may be owned by a local device and a matching local public key may be provided to the authentication service, e.g., at startup or at registration or at each session. Thus, when the authentication service generates the password that is later sent to the local device, the authentication service may first encrypt the password, using the local public key, and send the encrypted password. The local device may decrypt the encrypted password using the local private key to obtain the password.

According to embodiments of the invention, a third pair of matching private-public keys, referred to herein as the auxiliary (AUX) keys stored at the local device. The AUX public key may be used to encrypt the password, and the AUX private key may be encrypted with the symmetric key obtained from the authenticator, and stored encrypted on the local device.

An offline login may refer to a login process that takes place when there is no communication between the local device and the authentication service or when the authentication service is unavailable. An offline login may happen, for example, if the authentication service or the local device are offline or disconnected from the network (the internet or the organization network), or if the authentication service is not available for performing the login process for any other reason. Embodiments of the invention may improve the technology of secure login process by providing a secure offline login, as disclosed herein.

According to embodiments of the invention, when performing an offline login, the last password provided by the authentication service to the local device and access permission management service may be used for the login process and the identity of the user may be verified by the authenticator. Thus, to achieve an offline login, the last password provided by the authentication service to the local device should be stored on the local device. However, this creates a series security problem since this password may be stolen by a malicious entity. Obviously, the password may be encrypted. However, if the password and the decryption keys are both stored on the local device, this maintains the security problem, since the malicious entity breaking into the local device may get both the encrypted password and the decryption key from the local device and may be able to decrypt the password.

Some embodiments of the invention may solve this problem by using a symmetric key common to the local device and to the authenticator, as disclosed herein. According to embodiments of the invention, the symmetric key may be constructed in any known manner from two values, referred to herein as a first value (or salt) and a second value. For example, the symmetric key may be reconstructed by hashing a concatenation of the first value with the second value. Other methods for reconstructing a symmetric key from the first value and the second value may be used.

According to embodiments of the invention, during routine operation (e.g., anytime except for when performing an online or offline login as disclosed herein) the first value may be stored on the local device, the second value may be stored on the authenticator and the symmetric key may not be stored anywhere.

According to embodiments of the invention, the password may be encrypted using the symmetric key. For example, the local device may get the symmetric key from the authenticator (after providing first value to the authenticator), to encrypt the password. The symmetric key may then be deleted from the local device. Thus, a malicious entity breaking into the local device may get the encrypted password but may not be able to obtain the symmetric key, and therefore may not be able to decrypt or reconstruct the password.

However, according to embodiments of the invention, the password used for the login process may change from time to time. For example, the authentication service may generate a new password whenever the user logins into local device online, as disclosed herein. However, there may be other options for a user to login into the local device (e.g., a user may login without the authenticator or with a different authenticator), and a new password may be provided to the local device for each login attempt, as well as in other circumstances, e.g., after a predetermined period in which no login attempt has been made. Thus, there may be situations in which the password changes, but the local device cannot communicate with the authenticator and cannot reconstruct the symmetric key.

Therefore, encrypting the password itself with the symmetric key may create a problem, for example, if the password is encrypted by the symmetric key, and the authentication service has changed the password without the authenticator in the process. In this case, the next time the user is offline and needs to login, the client API together with the authenticator may construct the symmetric key, but when the client API decrypts the password, the decrypted password may not be updated.

According to embodiments of the invention, to avoid this scenario, the client API on the local device may generate a pair of keys, one public and one private, referred to herein as AUX public key and AUX private key. Instead of encrypting the password with the symmetric key, the client API may encrypt the AUX private key with the symmetric key, and encrypt the password with the AUX public key. Now, even if the authenticator is not a part of the authentication session and the password has changed by the authentication service, the client API on the local device can still encrypt the new password with the AUX public key which is stored on the local device and is not secured. In an offline login session, the client API on the local device may get the symmetric key from the authenticator after providing first value, decrypt the AUX private key, and with the AUX private key, decrypt the password to complete the offline login. According to some embodiments, the local device may generate the pair of AUX public key and AUX private keys one time, e.g., at startup.

According to embodiments of the invention, when receiving an encrypted password from an authentication service at the local device, the local device may decrypt the encrypted password with a local private key to obtain a decrypted password. The symmetric key may be constructed from the first value stored on the local device and the second value stored on the authenticator. For example, the local device may send the first value to the authenticator, the authenticator may construct the symmetric key, delete the first value and send the symmetric key to the local device, or the authenticator may send the second value to the local device and the local device may construct the symmetric key and delete the second value. In some embodiments, the symmetric key may be constructed by hashing a concatenation of the first value with the second value. Other methods for constructing a symmetric key from the first value and the second value may be used. The local device may encrypt the decrypted password with the AUX public key to obtain or create a locally encrypted password. The local device may encrypt the AUX private key with the symmetric key to obtain an encrypted AUX private key. Once the AUX private key is encrypted, the symmetric key may be deleted (e.g. from the local device and/or the authenticator). Thus, a locally encrypted password and an encrypted AUX private key may be stored on the local device. The symmetric key (required for decrypting the AUX private key), however, may not be stored on the local device, nor anywhere else, as the symmetric key was deleted. Therefore, a malicious entity breaking into the local device may not be able to decrypt the locally encrypted password.

According to embodiments of the invention, an offline login may be performed by reconstructing the symmetric key from the first value stored on the local device and the second value stored on or owned by the authenticator. For example, the local device may send the first value to the authenticator, the authenticator may reconstruct the symmetric key and send the symmetric key to the local device, or the authenticator may send the second value to the local device and the local device may reconstruct the symmetric key. Once the local device has the symmetric key, the local device may decrypt the encrypted AUX private key with the symmetric key to obtain the AUX private key, decrypt the locally encrypted password with the AUX private key to obtain the decrypted password, and use the decrypted password to perform the offline login.

Reference is made to FIG. 1, which is a system 100 according to embodiments of the invention. According to some embodiments, local device 110, authenticator 120, authentication service 130, and access permission management service 160 may include components of computing device 700. Access permission management service may be executed by a server or computer such as computing device 700.

Network 150 may include any type of network or combination of networks available for supporting communication between local device 110, access permission management service 160 and authentication service 130. Networks 150 may include for example, a wired, wireless, fiber optic, or any other type of connection, a local area network (LAN), a virtual private network (VPN), a wide area network (WAN), the Internet and intranet networks, etc. According to some embodiments, permission management service 160 and authentication service 130 may have a direct link between them, or may be connected through a local or private network, e.g., a LAN or WAN networks.

Access permission management service 160 may be a service or an application for managing access permissions to networked resources, e.g., to local device 110, and to authenticate users that require access the resources. Access permission management service 160 may be connected to password database 170. According to embodiments of the invention, when a user logins into local device 110, access permission management service 160 may obtain a password associated with the user from authentication service 130 and use the password obtained from authentication service 130 to authenticate local device 110, using any applicable method, as known in the art. Once the identity of the user is confirmed, access permission management service 160 may approve the login Access permission management service 160 may store user passwords or an encrypted or hashed version of the user password, or some other function of the user password in password database 170.

Authentication service or IdP 130 may be responsible of validating the user and generating a password for the user. Authentication service 130 may be connected to password database 140. According to embodiments of the invention, a new password may be generated when the user logins online to local device 110. When the user logins online to local device 110, local device 110 may send a login request to authentication service 130. In response, authentication service 130 may send a challenge to local device 110. In return, authentication service 130 may obtain a signed challenge (e.g., signed by authenticator 120 with the AUT private key 114) from local device 110. Authentication service 130 may verify the signed challenge using the AUT public key 134 to validate the user. If the user is successfully validated, authentication service 130 may generate a new password for the user, store the user's password, or encrypt the user password with the local public key 135 and store the encrypted user password, in password database 140 and send the new password to local device 110 and to access permission management service 160 that may store the new password in password database 170. Each of password databases 140 and 170 may be a storage device (e.g., storage 730 depicted in FIG. 5) used for storing user passwords and any other data, as required by the application.

Authenticator 120 may be a device external to local device 110 (e.g., physically separated from local device 110) or internal to local device 110 used to authenticate or verify an identity of the user. Authenticator 120 may be or may include for example, a hardware token, a mobile application operated on a mobile smartphone, a biometric reader, embedded biometric module (embedded for example in local device 110), e.g., an embedded fingerprint module, etc. While authenticator 120 is shown in FIG. 1 as connected to a single local device 110, this is not limiting, and authenticator 120 may be associated with a plurality of devices associated with the same user. Similarly, a user, or a local device 110 may be associated with more than one authenticator 120. For example, local device 110 may be associated with one or more hardware token, a mobile application operated on a mobile smartphone. Embodiments of the invention may provide a secure online and offline login process using authenticator 120, where a communication between local device 110 and authenticator 120 is required to perform each of the online and offline login processes. For example, during online and offline login processes local device 110 may send data such as a challenge and a first value 112 to authenticator 120 and authenticator 120 may send data such as a signed challenge and symmetric key 118 to local device 110.

In some embodiments, authenticator 120 may verify the identity of the user using any applicable method, e.g. using a PIN code, or by performing biometric authentication using at least one of a fingerprint, a facial pattern, an iris pattern, a retinal pattern, voice authentication, etc. In some embodiments, authenticator 120 may not have to actively verify the identity of the user, and the identity of the user may be verified just by communicating with authenticator 120, as disclosed herein. According to embodiments of the invention, authenticator 120 may store AUT private key 124. Authenticator 120 may also store a second value 122 required to reconstruct a symmetric key 118 common to local device 110 and to authenticator 120. In some embodiments, Authenticator 120 may store a value or a number and use the stored value or number to generate second value 122, e.g., by performing an operation on the stored value or number. In some embodiments, symmetric key 118 may be reconstructed by hashing a concatenation of first value 112 with second value 122. Other methods for reconstructing symmetric key 118 from first value 112 and second value 122 may be used.

Local device 110 may be a computing device associated with a user. An agent software or application may be executed by local device 110, e.g., a client API. Local device 110 may be connected to a computer network such network 150. Local device 110 may be locked, e.g., access of users to local device 110 may be prevented, unless a user logins local device 110. According to embodiments of the invention, to perform the login, the local device 110 may obtain the username, e.g., from the user through client API, from authenticator 120 or in any other manner. In contrary to many other systems, according to embodiments of the invention, the user does not have to provide a password. Instead, authentication service 130 may provide the password, as disclosed herein. Optionally, authentication service 130 may provide the password after the identity of the user may be verified. e.g., by authenticator 120. To complete the login process local device 110 may provide the password to a service on local device 110 that may communicate with access permission management service 160 and perform a login process using the password in any applicable manner as known in the art. According to embodiments of the invention, local device 110 may store encrypted AUX private key 114, AUX public key 116 and a first value 112 required to reconstruct a symmetric key 118 common to local device 110 and to authenticator 120. A method for performing an online login and offline login will be now demonstrated with relation to FIGS. 2-4.

Figure 2:
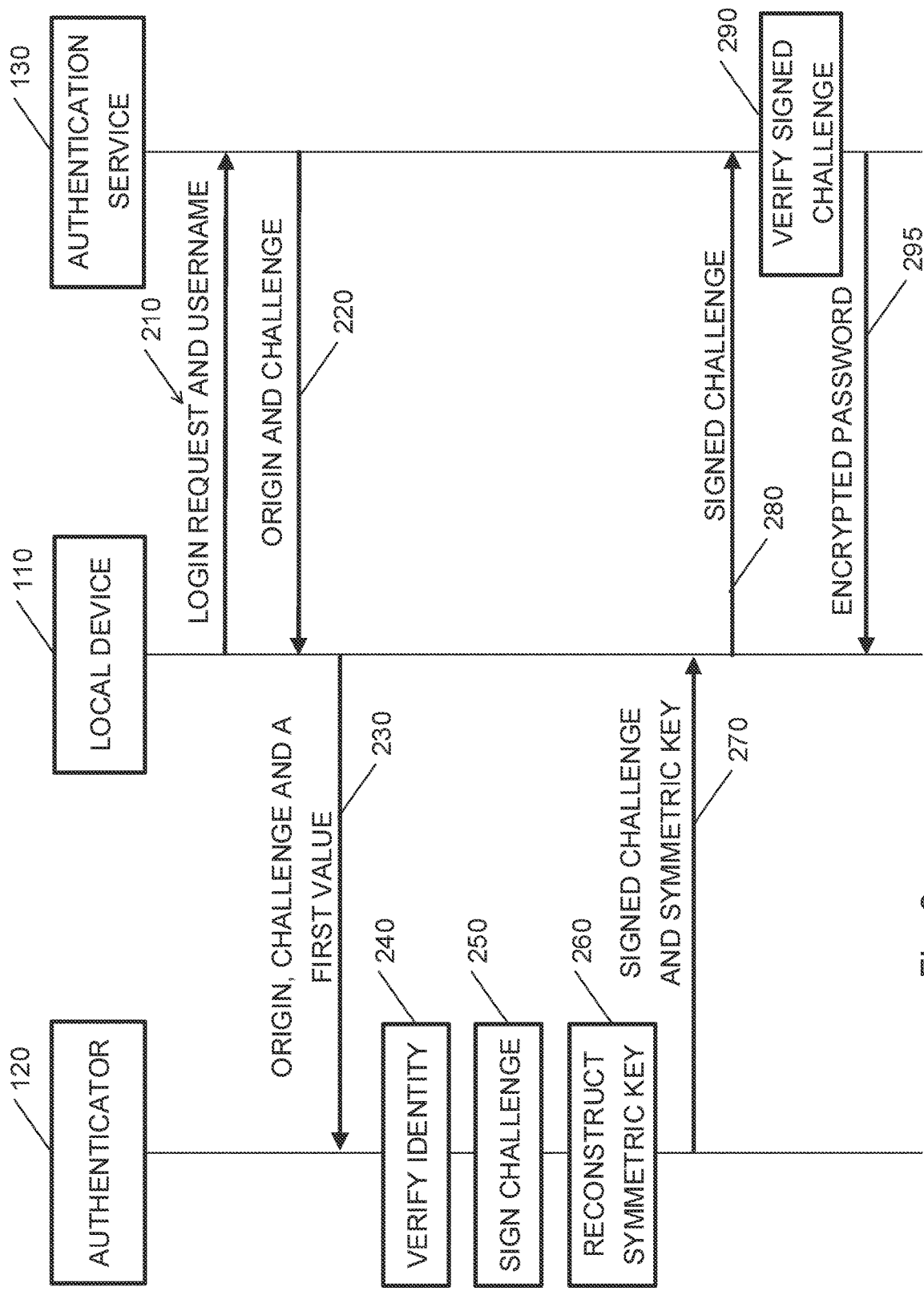
FIG. 2 is a flowchart of a method for obtaining a new password at a local device, as part of an online login process, according to embodiments of the invention.

Reference is made to FIG. 2, which is a flowchart of a method for obtaining a new password at local device 110, as part of an online login process, according to embodiments of the invention. An embodiment of a method for obtaining a new password at local device 110 may be performed, for example, by the systems shown in FIGS. 1 and 5. An embodiment of a method for obtaining a new password at local device may be performed as part of an online login process.

In operation 210, a local device 110 may send a login request and a username from local device 110 to authentication service 130. The login request and username may be obtained at local device 110, e.g., client API, from a user wishing to login to local device 110. In operation 220, authentication service 130 may send a challenge to local device 110 in response to the login request. Other data required for the login may be sent as well as required by the application, e.g., an origin. In operation 230, local device 110 may send the challenge and first value 112, also referred to herein as a salt, to authenticator 120. The salt, or first value 112 may be one of two values required in order to reconstruct a symmetric key 118 common to local device 110 and authenticator 120. In operation 240, authenticator 120 may verify the identity of the user using any applicable method. For example, authenticator 120 may verify the identity of the user by obtaining a PIN code from the user and comparing the obtained PIN code with a stored PIN code, and/or by performing biometric authentication using at least one of a fingerprint, a facial pattern, an iris pattern, a retinal pattern, voice authentication, etc. In operation 250, authenticator 120 may sign the challenge, for example using AUT private key 124, to obtain a signed challenge. In some embodiment, possession of AUT private key 124, e.g., signing the challenge using AUT private key 124 may be enough to verify the identity of the user, thus operation 240 may be omitted. In operation 260, authenticator 120 may reconstruct symmetric key 118, e.g., using first value 112 obtained from local device 110 and a second value 122 stored on an authenticator 120. Authenticator 120 may reconstruct symmetric key 118 after verifying an identity of the user. In operation 270, authenticator 120 may send the signed challenge and symmetric key 118 to local device 110. In operation 280, local device 110 may send the signed challenge to authentication service 130. In operation 290, authentication service 130 may verify the signed challenge using AUT public key 134. By verifying the signed challenge, authentication service 130 may verify the identity of the user, since the challenge that was originally sent by authentication service 130, could only be signed by authenticator 120 (operation 250), optionally after verifying the identity of the user (operation 240). Thus, in operation 295, after verifying the signed challenge, authentication service 130 may send an encrypted password (e.g., encrypted with local public key 135) to local device 110.

Figure 3:
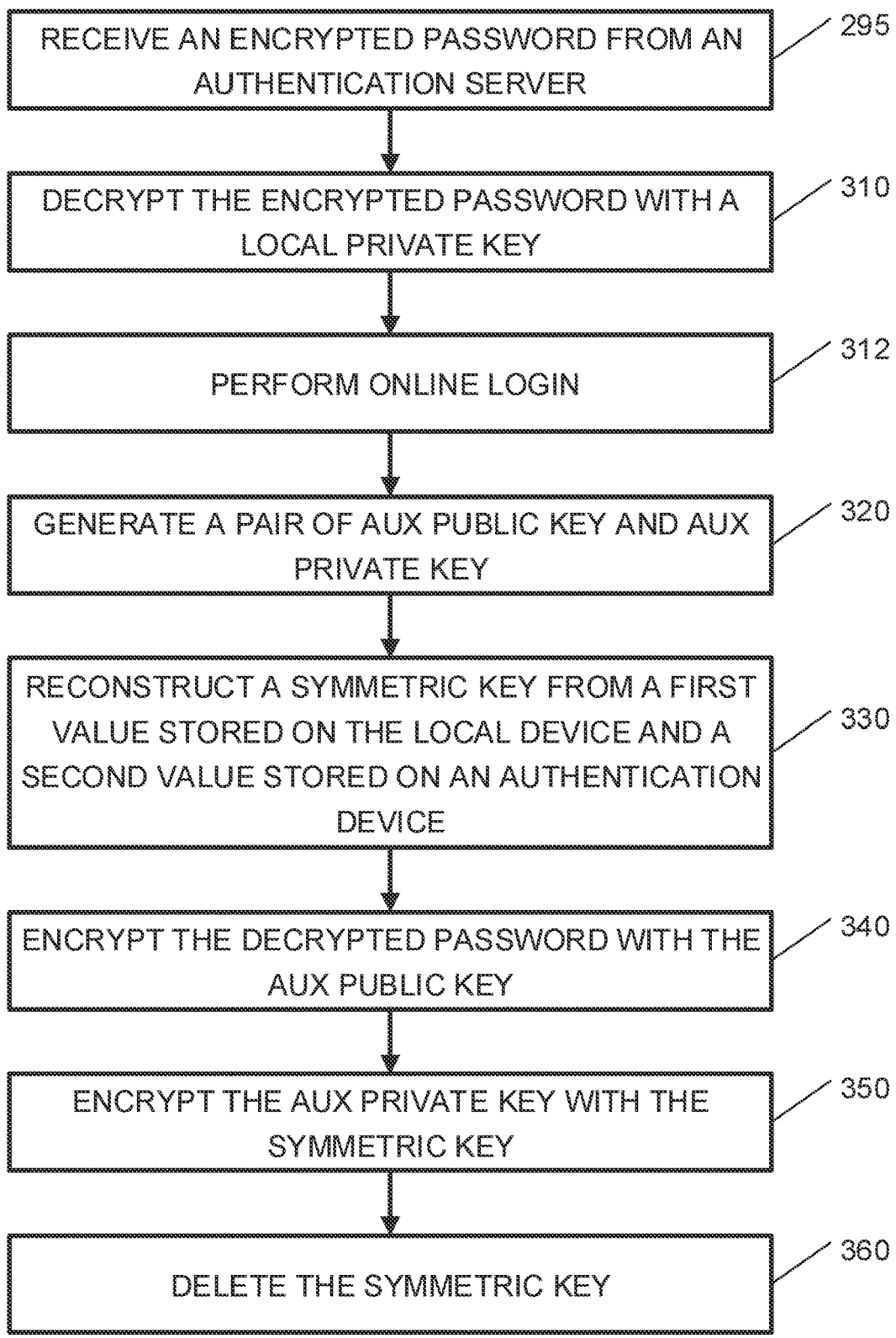
FIG. 3 is a flowchart of a method for storing an encrypted password in a local device, according to embodiments of the invention.

Reference is made to FIG. 3, which is a flowchart of a method for storing an encrypted password in local device 110, according to embodiments of the invention. An embodiment of a method for storing an encrypted password in local device 110 may be performed, for example, by the systems shown in FIGS. 1 and 5. An embodiment of a method for storing an encrypted password in local device 110 may be performed after receiving a password (clear or encrypted) from authentication service 130 at local device 110 as part of an online login, e.g., in operation 295.

In operation 310, local device 110 may decrypt the encrypted password with local private key 115 to obtain a decrypted or clear password. In operation 312, local device 110 may perform the login using the clear password. For example, local device 110 may use the clear password to request access permission management service 160 to login the user into local device 110 and to other services as required, using any applicable method, as known in the art. In operation 320, a pair of AUX public key 116 and AUX private key 114 may be generated, e.g., by local device 110. Operation 320 may be performed once at an initialization phase, on key registration or on first online login. Operation 320 may not be recreated for each login. In operation 330, symmetric key 118 may be reconstructed, e.g., from first value 112 stored on local device 110 and second value 122 stored on authenticator 120. For example, local device 110 may send first value 112 to authenticator 120, authenticator 120 may reconstruct symmetric key 118, delete first value 112, and send the symmetric key 118 to local device 110, or authenticator 120 may send second value 122 to local device 110 and local device 110 may reconstruct symmetric key 118 and delete second value 122. In operation 340, the decrypted password may be encrypted (e.g., by local device 110) with AUX public key 116 to obtain or create a locally encrypted password. In operation 350. AUX private key 114 may be encrypted (e.g., by local device 110) using symmetric key 118 to obtain an encrypted AUX private key. In operation 360, the symmetric key may be deleted, e.g., from local device 110 and if required from authenticator 120.

Thus, after performing operations 310-360, the local device may store the locally encrypted password (e.g., the password obtained from authentication service 130 encrypted with AUX public key 116) and the encrypted AUX private key (e.g., AUX private key 114 encrypted with symmetric key 118). Thus, a malicious entity that may break into local device 110 may not be able, even theoretically, to decrypt the locally encrypted password, since the AUX private key 114 that is required for decrypting the locally encrypted password, is encrypted with a key that is not found on local device 110 (and not anywhere else).

As noted, an embodiment of a method for storing an encrypted password in local device 110 may be performed after receiving a new password from authentication service 130 at local device 110 as part of an online login. However, there may be other options for a user to login into local device 110 (e.g., a user may login without authenticator 120), and a new password may be provided to local device 110 for each login attempt, as well as in other circumstances, e.g., after a predetermined period in which no login attempt has been made. When obtaining a new password, local device may encrypt the new password using AUX public key 116.

Figure 4:
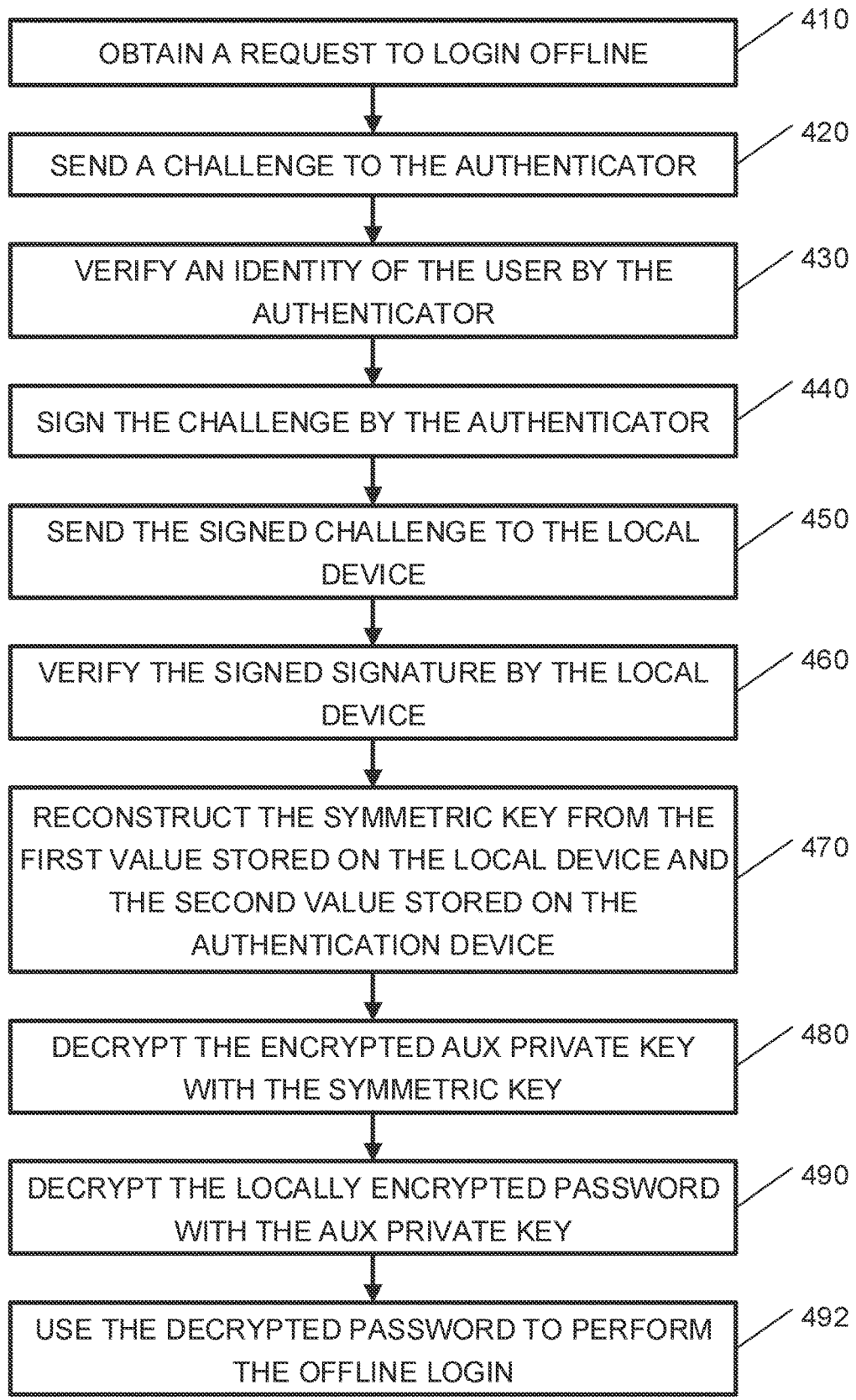
FIG. 4 is a flowchart of a method for performing an offline login, according to embodiments of the invention.

Reference is made to FIG. 4, which is a flowchart of a method for performing an offline login, according to embodiments of the invention. An embodiment of a method for performing an offline login may be performed, for example, by the systems shown in FIGS. 1 and 5. An embodiment of a method for performing an offline login may be performed when the user wishes to login into local device 110 and authentication service 130 is offline, local device 110 is offline, or local device 110 is not connected to network 150 and there is no secure channel to the organization network, e.g., when there is no communication between local device 110 and authentication service 130.

In operation 410, a request to login may be obtained at local device 110, e.g., a user may type a username in the client API. In operation 420, local device 110 may generate or create a challenge and send the challenge to authenticator 120. In operation 430, authenticator 120 may verify the identity of the user using any applicable method. For example, authenticator 120 may verify the identity of the user by obtaining a PIN code from the user and comparing the obtained PIN code with a stored PIN code, and/or by performing biometric authentication using at least one of a fingerprint, a facial pattern, an iris pattern, a retinal pattern, voice authentication, etc. In operation 440, authenticator 120 may sign the challenge, e.g., using AUT private key 124. Authenticator 120 may sign the challenge automatically (in this case the possession of authenticator 120 is enough for authenticating the user), after verifying user presence, or only if the identity of the user is actively and successfully verified, depending on the security level required. In operation 450, authenticator 120 may send the signed challenge to local device 120. In operation 460, local device 120 may verify the signed challenge, using a corresponding public key, e.g., AUT public key 134. In operation 470, symmetric key 118 may be reconstructed from first value 112 stored on local device 110 and second value 122 stored on the authenticator. For example, local device 110 may send first value 112 to authenticator 120, authenticator 120 may reconstruct symmetric key 118, delete first value 112, and send symmetric key 118 to local device 110, or authenticator 120 may send second value 122 to local device 110, and local device 110 may reconstruct symmetric key 118 and delete second value 122.

In operation 480, local device 120 may decrypt the encrypted AUX private key with symmetric key 118 to obtain AUX private key 114. In operation 490, local device 120 may decrypt the locally encrypted password with AUX private key 114 to obtain the decrypted password. In operation 492, the decrypted password may be used to perform an offline login. In some embodiments, offline login may be performed locally, e.g., the password may be provided to the operating system of local device 110 (e.g., to Windows®) and used together with a password that is stored locally by the operating system of local device 110 to authenticate the user. In some embodiments, offline login may be performed with access permission management service 160, using any applicable method.

Figure 5:
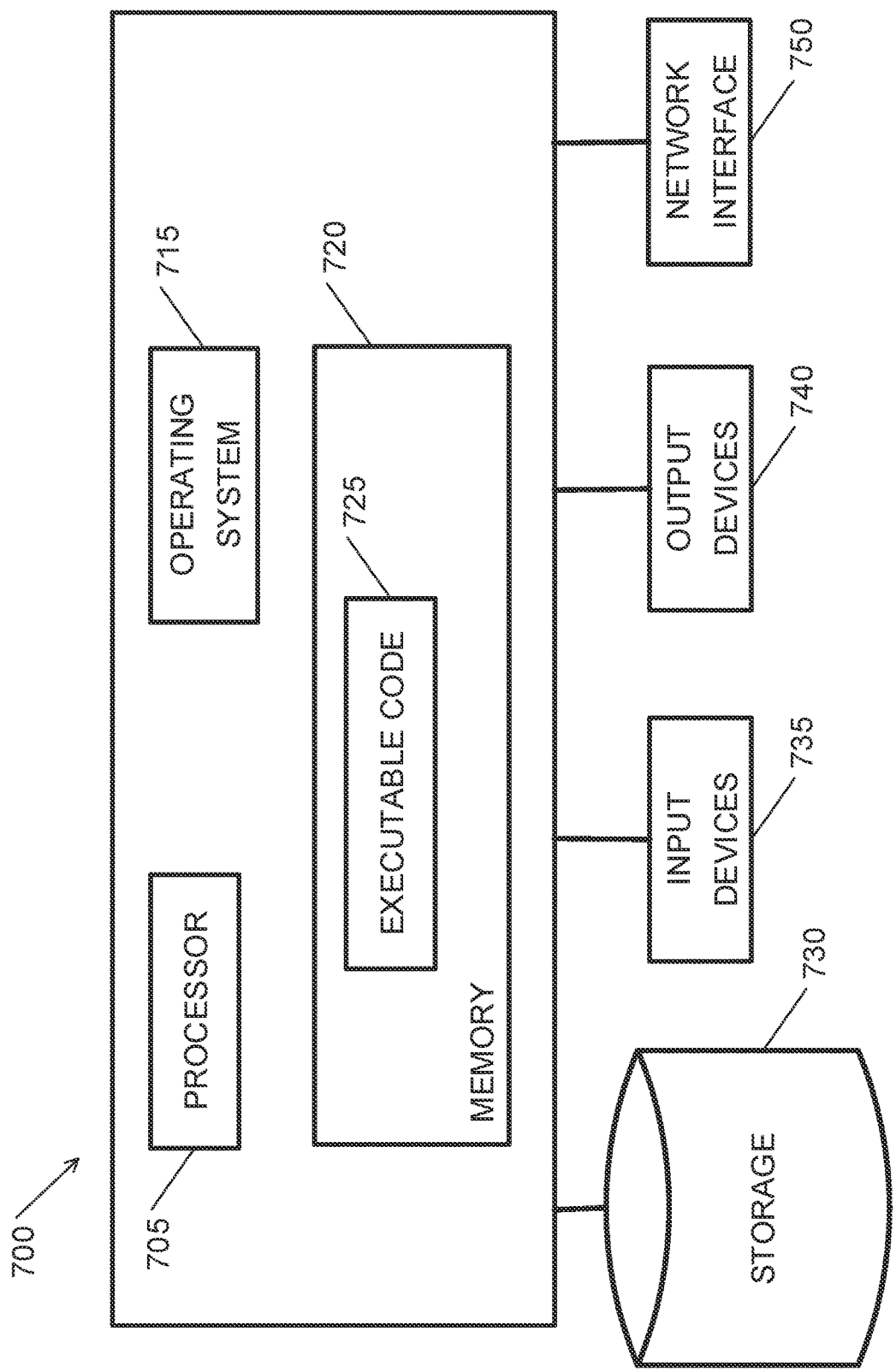
FIG. 5 illustrates an example computing device according to an embodiment of the invention.

FIG. 5 illustrates an example computing device according to an embodiment of the invention. Various components such as local device 110, authenticator 120, authentication service 130, and access permission management service 160 and other modules, may be or include, or be executed by, computing device 700, or may include components such as shown in FIG. 5. For example, a first computing device 700 with a first processor 705 may be used to perform online and offline login, according to embodiments of the invention.

Computing device 700 may include a processor 705 that may be, for example, a central processing unit processor (CPU), a chip or any suitable computing or computational device, an operating system 715, a memory 720, a storage 730, input devices 735 and output devices 740. Processor 705 may be or include one or more processors, etc., co-located or distributed. Computing device 700 may be for example a workstation or personal computer, or may be at least partially implemented by one or more remote servers (e.g., in the "cloud").

Operating system 715 may be or may include any code segment designed and/or configured to perform tasks involving coordination, scheduling, arbitration, supervising, controlling or otherwise managing operation of computing device 700, for example. Operating system 715 may be a commercial operating system. Operating system 715 may be or may include any code segment designed and/or configured to provide a virtual machine, e.g., an emulation of a computer system. Memory 720 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 720 may be or may include a plurality of, possibly different memory units.

Executable code 725 may be any executable code, e.g., an application, a program, a process, task or script. Executable code 725 may be executed by processor 705 possibly under control of operating system 715. For example, executable code 725 may be or include software for performing online and offline login, according to embodiments of the invention. In some embodiments, more than one computing device 700 may be used. For example, a plurality of computing devices that include components similar to those included in computing device 700 may be connected to a network and used as a system.

Storage 730 may be or may include, for example, a hard disk drive, a floppy disk drive, a Compact Disk (CD) drive, a CD-Recordable (CD-R) drive, a universal serial bus (USB) device or other suitable removable and/or fixed storage unit. Storage 730 may include or may store one or more databases 140 and 170, In some embodiments, some of the components shown in FIG. 5 may be omitted. For example, memory 720 may be a non-volatile memory having the storage capacity of storage 730. Accordingly, although shown as a separate component, storage 730 may be embedded or included in memory 720. Database 140 and 170 may be at least partially implemented by one or more remote storage devices 730 (e.g., in the "cloud").

Input devices 735 may be or may include a mouse, a keyboard, a touch screen or pad or any suitable input device. It will be recognized that any suitable number of input devices may be operatively connected to computing device 700 as shown by block 735. Output devices 740 may include one or more displays, speakers and/or any other suitable output devices. It will be recognized that any suitable number of output devices may be operatively connected to computing device 700 as shown by block 740. Any applicable input/output (I/O) devices may be connected to computing device 700 as shown by blocks 735 and 740. For example, a wired or wireless network interface card (NIC), a modem, printer or facsimile machine, a universal serial bus (USB) device or external hard drive may be included in input devices 735 and/or output devices 740. Network interface 750 may enable device 700 to communicate with one or more other computers or networks. For example, network interface 750 may include a Wi-Fi or Bluetooth device or connection, a connection to an intranet or the internet, an antenna etc.

Embodiments described in this disclosure may include the use of a special purpose or general-purpose computer including various computer hardware or software modules, as discussed in greater detail below.

Embodiments within the scope of this disclosure also include computer-readable media, or non-transitory computer storage medium, for carrying or having computer-executable instructions or data structures stored thereon. The instructions when executed may cause the processor to carry out embodiments of the invention. Such computer-readable media, or computer storage medium, can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general-purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computer" may be any computing system as previously defined herein, or any module or combination of modulates running on a computing system.

For the processes and/or methods disclosed, the functions performed in the processes and methods may be implemented in differing order as may be indicated by context. Furthermore, the outlined steps and operations are only provided as examples, and some of the steps and operations may be optional, combined into fewer steps and operations, or expanded into additional steps and operations.

The present disclosure is not to be limited in terms of the particular embodiments described in this application, which are intended as illustrations of various aspects. Many modifications and variations can be made without departing from its scope. Functionally equivalent methods and apparatuses within the scope of the disclosure, in addition to those enumerated, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used in this disclosure is for the purpose of describing particular embodiments only, and is not intended to be limiting.

This disclosure may sometimes illustrate different components contained within, or connected with, different other components. Such depicted architectures are merely exemplary, and many other architectures can be implemented which achieve the same or similar functionality.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

The invention claimed is:

1. A method for performing an offline login of a user to a local device, the method comprising:
    generating a pair of an auxiliary (AUX) public key and an AUX private key;
    receiving, from an authentication service, a password at the local device, wherein the password is associated with the user, wherein receiving the password comprises:
        receiving an encrypted password from the authentication service by the local device; and decrypting the encrypted password with a local private key to obtain the password;
reconstructing a symmetric key;
encrypting the password with the AUX public key to obtain a locally encrypted password, and storing the locally encrypted password on the local device;
encrypting the AUX private key with the symmetric key to obtain an encrypted AUX private key, and storing the encrypted AUX private key on the local device;
deleting the symmetric key; and
performing the offline login of the user when the authentication service is unavailable by:
verifying an identity of the user by an authenticator;
reconstructing the symmetric key from a first value stored on the local device and a second value stored on the authenticator;
decrypting the encrypted AUX private key with the symmetric key to obtain the AUX private key;
decrypting the locally encrypted password with the AUX private key to obtain the password; and
using the password to perform the offline login.

2. The method of claim 1, comprising, when performing the offline login:
verifying an identity of the user by the authenticator prior to reconstructing the symmetric key.

3. The method of claim 2, wherein verifying the identity of the user by the authenticator comprises performing biometric authentication.

4. The method of claim 2, wherein verifying the identity of the user by the authenticator comprises obtaining a PIN code from the user and comparing the obtained PIN code with a stored PIN code.

5. The method of claim 1, comprising, when performing the offline login:
sending a challenge to the authenticator;
verifying an identity of the user by the authenticator;
signing the challenge by the authenticator;
sending the signed challenge to the local device; and
verifying the signed challenge by the local device.

6. The method of claim 1, wherein reconstructing the symmetric key comprises:
sending the first value from the local device to the authenticator;
reconstructing the symmetric key by the authenticator; and
sending the symmetric key to the local device.

7. The method of claim 1, wherein the symmetric key is reconstructed by hashing a concatenation of the first value with the second value.

8. The method of claim 1, comprising performing online login by:
sending a login request and a username from the local device to the authentication service;
obtaining a challenge from the authentication service;
sending the challenge and the first value to the authenticator;
verifying an identity of the user by the authenticator;
signing the challenge by the authenticator to obtain a signed challenge;
reconstructing the symmetric key by the authenticator using the first value and the second value;
sending from the authenticator to the local device, the signed challenge and the symmetric key;
sending by the local device the signed challenge to the authentication service;
verifying the signed challenge by the authentication service; and
sending the encrypted password from the authentication service to the local device.

9. A system for performing an offline login, the system comprising:
a memory; and
a processor configured to:
generate a pair of an auxiliary (AUX) public key and an AUX private key;
receive a password, from an authentication service by:
receiving an encrypted password from the authentication service; and
decrypting the encrypted password with a local private key to obtain the password;
obtain a symmetric key;
encrypt the password with the AUX public key to obtain a locally encrypted password, and storing the locally encrypted password on the local device;
encrypt the AUX private key with the symmetric key to obtain an encrypted AUX private key, and storing the encrypted AUX private key on the local device; and
delete the symmetric key; and
perform the offline login of the user when the authentication service is unavailable by:
obtaining the symmetric key;
decrypting the encrypted AUX private key with the symmetric key to obtain the AUX private key;
decrypting the locally encrypted password with the AUX private key to obtain the password; and
using the password to perform the offline login.

10. The system of claim 9, comprising an authenticator, wherein the authenticator is configured to:
obtain a first value from the processor;
verify an identity of the user;
reconstruct the symmetric key from the first value and a second value owned by the authenticator; and
send the symmetric key to the processor.

11. The system of claim 10, wherein the authenticator is configured to reconstruct the symmetric key by hashing a concatenation of the first value with the second value.

12. The system of claim 10, wherein the authenticator is configured to verify the identity of the user by performing biometric authentication.

13. The system of claim 10, wherein the authenticator is configured to verify the identity of the user by obtaining a PIN code from the user and comparing the obtained PIN code with a stored PIN code.

14. The system of claim 9, comprising an authenticator,
wherein the processor is configured to, when performing the offline login:
send a challenge to the authenticator;
wherein the authenticator is configured to:
verify an identity of the user;
sign the challenge;
send the signed challenge to the processor; and
wherein the processor is configured to:
verify the signed challenge.

15. The system of claim 9, comprising:
an authenticator;
wherein the processor is configured to perform an online login by:
sending a login request and a username to an authentication service;
obtain a challenge from the authentication service;
send the challenge and the first value to the authenticator;
wherein the authenticator is configured to:
verify an identity of the user;

sign the challenge to obtain a signed challenge;
reconstruct the symmetric key using the first value and the second value;
send the signed challenge and the symmetric key to the processor;
wherein the processor is configured to:
send the signed challenge to the authentication service; and
obtain the encrypted password from the authentication service.

\* \* \* \* \*